(12) United States Patent
Sauter et al.

(10) Patent No.: US 7,116,688 B2
(45) Date of Patent: Oct. 3, 2006

(54) LASER SYSTEM AND METHOD FOR GENERATION OF A PULSE SEQUENCE WITH CONTROLLABLE PARAMETERS AND COMPUTER PROGRAM PRODUCT

(75) Inventors: Thomas Sauter, Heidelberg (DE); Leander Zickler, Menlo Park, CA (US)

(73) Assignee: 20/10 Perfect Vision Optische Geraete GmbH, Heidelberg (DE)

( * ) Notice: Subject to any disclaimer, the term of this patent is extended or adjusted under 35 U.S.C. 154(b) by 93 days.

(21) Appl. No.: 10/635,154

(22) Filed: Aug. 6, 2003

(65) Prior Publication Data

US 2004/0160995 A1 Aug. 19, 2004

(30) Foreign Application Priority Data

Feb. 14, 2003 (EP) .................. 03003459

(51) Int. Cl.
*H01S 3/10* (2006.01)
*H01S 3/117* (2006.01)

(52) U.S. Cl. .................................. 372/25; 372/13
(58) Field of Classification Search ............ 372/10–20, 372/25, 9
See application file for complete search history.

(56) References Cited

U.S. PATENT DOCUMENTS

| | | | |
|---|---|---|---|
| 3,836,866 A * | 9/1974 | Ammann et al. .............. 372/12 |
| 3,869,680 A | 3/1975 | Fletcher et al. |
| 4,025,875 A * | 5/1977 | Fletcher et al. ............... 372/30 |
| 4,044,316 A | 8/1977 | Kennedy |
| 4,485,473 A | 11/1984 | Tang et al. |
| 4,896,119 A | 1/1990 | Williamson et al. |
| 4,930,901 A * | 6/1990 | Johnson et al. ............... 372/26 |
| 4,973,330 A | 11/1990 | Azema et al. |
| 5,016,251 A * | 5/1991 | D'Arcy ........................ 372/10 |
| 5,018,152 A * | 5/1991 | Linne et al. ................... 372/25 |
| 5,128,601 A | 7/1992 | Orbach et al. |
| 5,128,949 A * | 7/1992 | Barnes ......................... 372/25 |
| 5,130,997 A * | 7/1992 | Ortiz et al. ................... 372/21 |
| 5,197,074 A * | 3/1993 | Emmons et al. .............. 372/26 |
| 5,204,867 A * | 4/1993 | Koschmann .................. 372/33 |
| 5,272,713 A * | 12/1993 | Sobey et al. .................. 372/69 |
| 5,291,505 A | 3/1994 | Nielsen |
| 5,317,376 A * | 5/1994 | Amzajerdian et al. ...... 356/28.5 |
| 5,321,709 A * | 6/1994 | Beausoleil .................... 372/22 |
| 5,339,323 A * | 8/1994 | Hunter et al. ................. 372/25 |
| 5,343,483 A * | 8/1994 | Farrell et al. ................. 372/10 |
| 5,408,480 A * | 4/1995 | Hemmati ...................... 372/10 |
| 5,673,281 A * | 9/1997 | Byer ............................. 372/3 |
| 5,724,170 A | 3/1998 | Aizawa |
| 5,982,790 A | 11/1999 | Grossman et al. |
| 6,002,484 A | 12/1999 | Rozema et al. |
| 6,009,110 A * | 12/1999 | Wiechmann et al. ......... 372/10 |

(Continued)

*Primary Examiner*—James Menefee
*Assistant Examiner*—Phillip Nguyen
(74) *Attorney, Agent, or Firm*—Nydegger & Associates

(57) ABSTRACT

A laser system for generating at least one pulse and/or pulse sequence(s) of pulses having at least one specified property, such as pulse energy, duration, peak intensity, pulse form and/or timing includes an amplifying cavity. The amplification process is monitored in the amplifying cavity to obtain data about at least one property of the pulse sequence and/or the single pulse(s). The system also compares the obtained data with reference data and it controls at least one switching means for inputting, outputting and/or retaining the pulse(s) in the amplifying cavity such that at least one property of the pulse sequences and/or the pulses at an output of the laser system has substantially a specified value.

20 Claims, 7 Drawing Sheets

U.S. PATENT DOCUMENTS

| | | |
|---|---|---|
| 6,050,687 A | 4/2000 | Bille et al. |
| 6,122,097 A * | 9/2000 | Weston et al. ............... 359/345 |
| 6,155,684 A | 12/2000 | Bille et al. |
| 6,199,794 B1 * | 3/2001 | Naiman et al. ............ 244/3.16 |
| 6,339,604 B1 | 1/2002 | Smart |
| 6,654,391 B1 * | 11/2003 | Adams ......................... 372/10 |
| 6,781,677 B1 * | 8/2004 | Muenter et al. ........... 356/5.05 |
| 2001/0021215 A1 | 9/2001 | Bunting et al. |
| 2002/0085608 A1 | 7/2002 | Kopf et al. |
| 2003/0193975 A1 * | 10/2003 | Pang ........................... 372/25 |

* cited by examiner

LASER SYSTEM AND METHOD FOR GENERATION OF A PULSE SEQUENCE WITH CONTROLLABLE PARAMETERS AND COMPUTER PROGRAM PRODUCT

The foreign priority benefit of the prior filing date of Feb. 14, 2003 for foreign application number 03003459.9 filed in Europe is claimed for the present application.

FIELD OF THE INVENTION

The invention refers to a laser system, a controller and a method for generation of at least one pulse and/or a pulse sequence(s) with controllable parameters such as pulse energy, pulse duration, pulse timing, pulse peak energy, pulse form, pulse, repetition rate, and timing and/or parameters derived from them, as well as to a computer program. In particular the invention refers to a generation of controllable pulse sequences of ultrashort (femto- and picosecond) pulses.

The wide range of application areas contains, but is not limited to, laser material processing, medical applications of lasers such as e.g. laser microkeratome LMK, refractive corneal surgery, fs-LASIK, laser neurosurgery, optical measuring technology and/or data processing.

BACKGROUND OF THE INVENTION

Optical technologies (photonics) are increasingly being used in particular in the fields of laser material processing, for example in nanotechnologies or for the precise manipulation of biological material. Of particular interest and importance is the interaction of laser light and material with very short laser pulses ($10^{-12}$s to $10^{-15}$s) which is based on fundamentally new physical processes and can be advantageously used for high precision material processing.

Conventional ultrashortpulse laser systems are constructed and optimized to generate pulse sequences having a constant pulse repetition rate (i.e. a constant timing, or a constant temporal distance between two subsequent pulses) and having constant pulse energies. In particular when constructing pulse lasers, up to now these systems are being optimized for a fixed pulse repetition rate—i.e. the pulse sequence is generated asynchronously from the targeted application and with a constant pulse to pulse distance. The synchronization of the single pulse(s) of the continuously generated pulse sequence (also called pulse train) for example with an external process or with a target application in such systems is usually realized with the help of additional optical elements (optical switch) which can uncouple (separate) or select single pulse or a number of pulses from the already generated pulse sequence. This method is expensive and not efficient, since a large part of the generated laser energy is not used.

Apart from synchronizing the laser pulse emission with external events (i.e. the timing of the single pulses in the pulse sequence), another important parameter is the pulse energy. In conventional laser systems, pulses with desired energy can be generated by introducing variable losses in the generated usable beam. This is realized for example by inducing changes in the polarization in conjunction with an optical element with polarization-dependent transmission. However, with the available technical means this is only possible with relatively high temporal inertia. For example, consider a mechanical setup that can change the polarization of a laser beam to a desired orientation in 0.1 s and a pulse repetition rate of 10 kHz (pulses 100 microseconds apart). Up to now the energy of the pulses in a pulse sequence can therefore only be controlled over more than 1000 pulses, whereas for many applications it is desirable and necessary to change the energy on a pulse-to-pulse basis.

An attempt to control the properties of the pulses within the laser cavity in order to achieve stable pulse-to-pulse characteristics (usually a pulse sequence with constant repetition rate and small variation of the single pulse energies) is made for example with a Q-switched (Q-switching: cavity loss modulation) laser.

U.S. Pat. No. 5,982,790 describes a system and a method for reducing pulse-to-pulse energy and peak power variation in various types of pulsed lasers, in particular Q-switched lasers. The laser system described therein comprises a laser cavity having a lasing medium pumped by a pumping device for delivering pumping energy to the medium. The system includes further a detection device and a circuitry for determining the pulse magnitudes of laser pulses, such as the peak pulse amplitudes, the pulse energies, the pulse widths or other pulse metrics. The system comprises further a feedback mechanism which is in communication with the pumping device and which ensures pulse-to-pulse stability by increasing the pump energy when the pulse magnitude of the i-th pulse exceeds a mean pulse magnitude and decreasing it when it is less than the mean pulse magnitude. Alternatively, the feedback mechanism is in communication with the switching device which controls the variable loss factor of the Q-switch to achieve pulse-to-pulse peak and energy stability.

U.S. Pat. No. 6,339,604 discloses a pulsed laser system which includes a laser pump, a laser rod, a reflector interposed between the laser pump and the laser rod, through which energy from the laser pump enters the laser rod, an output reflector through which energy is emitted from the laser rod, a switch interposed between the laser rod and the output reflector and a control device. When closed, the switch causes energy to be stored in the laser rod and, when opened, allows energy to be emitted from the laser rod during an emission period. The control device allows a primary pulse emitted from the laser rod during the emission period to impinge on a workpiece and subsequently blocks or eliminates the workpiece secondary laser emission occurring during the emission period after emission of the primary pulse. The pulsed laser system is operated over a range of repetition rates, so as to cause laser energy to be emitted during a plurality of emission periods at each repetition rate. At least a portion of the laser energy emitted during the emission periods is directed toward the target structure. The switch is closed for a fixed, predetermined period of time prior to each emission period regardless of repetition rate of the primary laser pulse within the range of repetition range in order to store energy in the laser rod. The pump is operated continuously at constant power.

With pulse lasers in the nanosecond range that are based on the principle of Q-switch (control of the losses in the cavity) the pulse duration and the pulse energy cannot be adjusted independently from each other by the variation of the amplification time. That is to say, with increasing pulse energy the pulse duration is also increased considerably. Furthermore, these systems are directed at the generation of nanosecond pulses, rather than at the generation of ultrashort pulses in the pico- to femtosecond range.

In view of the above problems the object of the present invention is to realize an improved laser system in particular for the generation of short and ultrashort pulses which is capable of generating arbitrary, programmable and in particular dynamically synchronizeable pulse sequences.

SUMMARY OF THE INVENTION

This object is solved by a laser system for generating pulse sequences, a method for generating a pulse sequence, a computer program and a laser system controller.

According to the invention there is provided a laser system for generating at least one pulse and/or a pulse sequence(s) of pulses having at least one specified (predetermined or predeterminable) property, such as pulse energy, duration, peak intensity, pulse form and/or timing, comprising an amplifying cavity; at least one detecting means for monitoring an amplification process in the amplifying cavity and obtaining data about at least one property of the pulse sequence and/or the single pulse(s); at least one control means which can compare the data obtained by the detecting means with reference data and control at least one switching means for inputting, outputting and/or retaining the pulse(s) in the amplifying cavity such that at least one property of the pulse sequences and/or the pulses at an output of the laser system has substantially a specified (predetermined or predeterminable) value.

Particularly, the initial (seed) pulse from an optical pulse source is amplified while it makes its round trips (circulates) in the amplifying cavity and is monitored/detected by the detecting means (sensor) within the amplifying cavity. The point in time at which the pulse enters and/or leaves the amplifying cavity (or in other words the input/output timing) is determined and/or controlled by the control means which receives a signal from the detecting means such that the amplified pulse has at a specified (predetermined or predeterminable) point in time one or more specified (predetermined or predeterminable) properties. This principle will be shortly called hereinafter "pulse-on-demand". Thus, the present invention differs from the conventional Q-switched lasers, in that the modulation of the pulse properties is achieved by a specified selection of the input/output timing, in particular of the output timing, rather than by means of a cavity loss control as in the prior art.

Any light pulse can be defined by its physical parameters such as wavelength, bandwidth, pulse duration (or temporal width), pulse form, pulse energy, location in time (or pulse timing) and further parameters derived from these. For example, a pulse sequence denoted $\{P_i\}=\{E_0; T_0; \tau_0; P_i(\Delta E_i; \Delta T_i; \Delta \tau_i)\}$ may be defined recursively by the energy $E_0$, the point in time $T_0$, and the temporal width (duration) $\tau_0$ of the initial laser pulse $P_0$, as well as the energy differences $\Delta E_k = E_k - E_{k-1}$, the distance in time $\Delta T_k = T_k - T_{k-1}$ of the k-th pulse to its predecessor (k-1-th pulse), and the difference in temporal width $\Delta \tau_k = \tau_k - \tau_{k-1}$. Formally, $\Delta E_0 = \Delta T_0 = \Delta \tau_0 = 0$ is defined. According to the invention, the specified (or the desired) pulse sequence $\{P_i\}$ can be predetermined or can be predeterminable (or dynamically controlled) during the pulse emission. Thus, depending on application, specific, application-dependent pulse and/or pulse sequence with specified (predetermined or predeterminable) properties or a combination of these can be generated and preferably adjusted dynamically, allowing for example a synchronization of pulse generation with asynchronous external processes. Moreover, since pulse sequences with desired parameters are directly generated rather than obtained by simply selecting a part of the already generated pulse sequence, the system particularly allows for an efficient use of the available energy. Another advantage is that certain properties of the pulse sequence may be controlled independently from each other, so that pulses having specified (predetermined or predeterminable) parameters may be generated.

According to a preferred embodiment of the invention, the laser system is used for the generation of or generates ultrashort, in particular femto- or picosecond pulses (having wide spectral bandwidth) and/or pulse sequences with specified (predetermined or predeterminable) properties at the output of the laser system. This is difficult if not impossible to realize with conventional laser systems, which are based on the principle of Q-switching, i.e. cavity loss control/modulation. On the contrary, the present laser system is based on the selection of the point in time the pulse enters/leaves the amplifying cavity. This advantageously allows to generate ultrashort pulses and/or pulse sequences with specified (predetermined or predeterminable) properties at the output of the laser system.

Preferably, the laser system comprises or is used as a regenerative laser amplifier.

Further preferably, the control means controls the switching means such that at least one property of the pulse sequence and/or the pulse(s) has at an output of the laser system a substantially constant value or varies according to a predetermined law preferably independently of one or more other properties.

In particular the points in time $T_k = \Delta T_k + T_{k-1}$ and/or the energies $E_k = \Delta E_k + E_{k-1}$ of the single pulses $P_k$ can be specified or controlled (pulse-on-demand). Preferably the point in time $T_k = \Delta T_k + T_{k-1}$ of the pulse emission and/or the energy $E_k = \Delta E_k + E_{k-1}$, for each pulse in the pulse sequence are controlled, while the temporal pulse width (pulse duration) $\tau_k = \Delta \tau_k + \tau_{k-1}$ is kept constant, i.e. $\Delta \tau_k$ is essentially zero. Thus, the energy of pulse sequence(s) can be controlled on a pulse-by-pulse basis (i.e. for each single pulse independently of each other single pulse) and the pulse to pulse distance (i.e. pulse timing) is adjustable particularly without influencing the pulse duration at the same time.

This allows, for example, to generate pulse sequences having a predetermined energy profile (the variation of the pulse energy in the pulse sequence) at a desired point in time. In particular, the energy of the pulses in the pulse sequence can be made constant, thus particularly achieving very stable pulse sources, independent of gain, pump or other fluctuations.

Preferably, the control means controls the switching means such that the energy of the generated pulses is greater than a first specified value, i.e. greater than a minimum energy level and/or smaller than a second specified value, in particular smaller than a specified (predetermined or predeterminable) critical energy $E_{crit}$. Thus, for example the security of laser surgery (in particular in corneal eye surgery) can be substantially improved, since already during pulse generation, the pulse energy level can be controlled not to surpass a certain safety level.

Still further preferably, the laser system may comprise at least one pulse dispersion compensating means for substantially compensating the dispersion of the pulse per amplifying cavity pass such that the duration of the pulses at the output of the laser system is substantially constant.

The dispersion per full turn in the amplifying cavity, which is caused to first order by group velocity dispersion (i.e. the different propagation time of the spectral components within the amplifying cavity, causing time delays between the single spectral components) is preferably compensated by the dispersion compensating means. Thus the pulse duration can be made independent of its number of passes (turns) in the cavity and pulses with substantially constant duration but other variable parameters or properties, such as pulse energy, may be generated at any point in time.

Still further preferably, the laser system comprises at least one pulse dispersive means for introducing a specified (predetermined or predeterminable) amount of pulse dispersion per amplifying cavity pass so that the pulse duration at an output of the laser system is variable; for introducing a specified (predetermined or predeterminable) amount of pulse dispersion per amplifying cavity pass such that the peak intensity of the pulses in the amplifying cavity is less than a predetermined value; and/or for generating spatially divided pulse spectral components in the amplifying cavity such that at least one pulse spectral component is selectively amplified thereby preferably increasing the effective amplification bandwidth of the laser system.

The dispersive means may comprise at least one chirped mirror having a dispersive reflection and/or at least one prism and/or at least one diffractive means (e.g. diffraction grating).

There exists a basic relationship between the pulse bandwidth/spectrum and the pulse duration (i.e. time-bandwidth product), which states that a short pulse exhibits a broad spectrum. A device that for example delays some certain frequencies within the pulse spectrum relative to other frequencies (chirp) can in principle change the pulse shape, i.e. stretch the pulse or compress an already chirped pulse.

The dispersive means may also preferably introduce a specified (predetermined or predeterminable) amount of dispersion per cavity turn (pass) so that the pulse duration becomes dependent on the number of turns which the pulse makes in the amplifying cavity. Thus, pulses having a variable pulse duration can be generated, which can be expressed as $\{P_i\}=\{E_0; T_0; \tau_0; P_i(\Delta E_i; \Delta T_i; \Delta \tau_i)\}$, wherein the pulse duration $\tau_i$ of every pulse $P_i$ can be changed or controlled according to a specified (predetermined or predeterminable) law.

The dispersive means may be also used to stretch the pulse in time so that the peak intensity during the amplification process in the amplifying cavity (stretch-on-the-fly), that is to say $$\hat{P}\left(n \cdot \frac{2L}{c}\right) = \frac{E_n}{\tau_n} \leq \hat{P}_{crit},$$

wherein c is the speed of light, L is the length of the amplifying cavity, n is the number of passes in the cavity, $E_n$ is the n-th pulse energy and $\hat{P}$ is the peak pulse intensity, $\hat{P}_{crit}$ is the critical energy. Thus, for example damages to the amplifying medium are avoided.

Following amplification, the pulse is preferably re-compressed to near or about its original duration.

The dispersive means may also be used to spatially divide the spectral components of a pulse in the amplifying medium, so that a selective amplification of the different pulse spectral regions may be realized. The selective amplification of the different spectral regions/spectral components may be realized by employing selective pumping of the amplifying medium, for example by means of a pump optic comprising at least one Spatial Light Modulator (SLM). Thus, for example an overall amplification bandwidth of the laser system may be increased allowing for the generation of shorter pulses at the output of the laser system.

The amplifying cavity preferably comprises a plurality of amplifying media, in order to increase the effective amplification bandwidth of the laser system and/or to achieve a higher gain.

The amplifying media may be chosen such that the resulting amplification profile (energy of the pulses vs. time of circulation/number of cavity passes) is wider than the amplification profiles of each of the amplifying media. Thus the overall amplification bandwidth of the system is increased, which allows for generation at the output of the laser system of respectively shorter pulses.

Further preferably, the effective length of the amplifying cavity can be changed or selected so that it substantially corresponds to the operating speed of the switching means and/or the control means. By increasing the length of the amplifying cavity "d", the time difference between complete passes (turns) of the amplifying cavity also increases:

$$T = \frac{2d}{c},$$

where c is the speed of light. Thus, the length of the amplifying cavity is preferably controlled or set so as to substantially conform to the response time of the switching means and in particular to the response time of the switching means and/or to the response time of the control means.

The laser system may preferably comprise at least one passive switching means, whose state does not depend on the control means.

Thus, the properties of the pulse sequence may be manipulated independently on or only indirectly dependently on the state of the control means. Thus, for example a pulse may be inputted, outputted and/or retained in the amplifying cavity and/or one or more properties of the amplification process may be influenced as a response to the signal from an internal and/or external trigger.

The laser system may preferably comprise a pump modulation means for changing at least one characteristic of an amplification process in the amplifying cavity. For example in order to achieve a specific (predetermined or predeterminable) amplification process (i.e. specific amplification properties) the pump means, which pumps at least one amplifying medium within the amplifying cavity, can be suitably modulated, for example by modulating the pump current.

The reference data may preferably comprise data received from an external trigger; user settings input device; a seed pulse source, which outputs a seed pulse to the laser amplifier; a monitoring means, which monitors the state of progress of an application process involving the emitted from the laser system pulse sequence; and/or a prior data obtained from the detecting means during an amplification process in the amplifying cavity, and wherein the reference data can be in particular dynamically or periodically updated.

The external trigger may control the control means so as to input, and/or output and/or retain the signal from the amplifying cavity.

Furthermore, the external data may comprise data received from the user settings input device, thus allowing preferably a (dynamic) change of the pulse and/or pulse sequences characteristics (properties) in line with the changed user settings.

Still further preferably, the control means may receive data from the seed pulse source, so as to control the switching depending on the properties of the seed pulse, e.g. timing and/or seed pulse stability.

Preferably, the generated pulse(s) and/or pulse sequence is directed to a target application, a second detecting means (sensor) detects at least one property of the targeted application process involving the generated pulse(s) and sends a signal to the control means comprising information about the progress of the targeted application process. The control means can decide depending on the received information on the further progress of the amplification process and can control the switching means so as to obtain the desired pulse and/or pulse sequence parameters (shortly called closed-loop). Additionally to processing data received from the application progress, the invention allows synchronization of the laser system (properties of the pulse(s) and/or pulse sequences) to asynchronous application processes, such as for example eye tracking in eye laser surgery or mechanical actuators thus generating pulses at substantially the point in time, that is requested by the application.

More preferably, the control means controls the switching means such that the properties (characteristics) of the amplification process so far (i.e. the data obtained by the detecting means during the amplification process in the amplifying cavity) are taken into account. In particular, the external data may be dynamically updated based on the obtained so far data (or in other words extrapolated based on the prior data). The control means operates on the difference(s) between the external data and the detected data exhibiting preferably proportional, differential and/or integral behavior and extrapolates the time of switching of the switching means based on the characteristic amplification process.

The amplifying cavity, defined in general between two end surfaces, such as for example plane mirrors, comprises at least one amplifying medium which is pumped from the pump means (or shortly pump) for example optically (e.g. flash lamp, diode lasers, etc.) or electrically. After entering the amplifying cavity, the seed pulse makes a number of turns or passes (circulates) within the cavity, while being amplified (i.e. increasing its energy) every time it passes through the amplifying medium, which may be for example a Ti:sapphire, Nd:YAG, Nd:Glass; Nd:YLF; Yt:glass; Cr:LiSaF or any other appropriate amplifying (gain) medium. The optical pulse source is preferably a laser source, for example Nd:glass oscillator, laser diode, Ti: sapphire laser, etc, preferably capable of generating ultrashort (femto- and picosecond) pulses, which are coupled into the amplifying cavity preferably through input optics. Of course, the amplifying cavity may also comprise other optical elements, such as for example mirrors, lenses, prisms, diffraction gratings, spatial light modulators, etc., forming for example a mode control unit or means, a focusing assembly, etc.

The control means may be realized as a FPGA (Field Programmable Gate Array) and/or an ASIC (Application Specific Integrated Circuit), which may be synchronized with the optical seed pulse source. The bandwidth of the detecting and/or control means should be appropriately chosen such that the pulse property (or properties) can be analyzed within one round trip (or pass) of the pulse inside the amplifying cavity. Preferably the bandwidth of the detecting and/or control means is approximately or greater than 200 MHz. The switching means may comprise electrooptical light modulators (EOM); acousto-optical light modulators (AOM); magneto-optical modulators; switching means based on change in the wavelength, for example periodically poled nonlinear materials such as lithium niobate, KTP for efficient frequency conversion in conjunction with dichroic mirror coating/beamsplitter and/or other high speed optical switches. The repetition rate of the optical switching means is preferably in the range 1 to 200 KHz, most preferably greater than 10 KHz.

The detection of the current pulse properties, for example the pulse energy can be realized for example by integrating the signal/data from a photodiode (such a GaAs diode) and passing it through a sample-and-hold circuit. Since at present the latency time of conventional optical switches lies above the time necessary for a pulse to make one turn in the amplifying cavity, preferably the point in time when the pulse is to be outputted (dumped) from the amplifying cavity is extrapolated by the control means using laser theory models of the laser (amplifier) behavior (i.e. modeling the amplification process). This allows to start the optical switching at a specified time, such that a pulse with at least one specified (predetermined or predeterminable) property is later outputted from the amplifying cavity and made available at the output of the laser system for further use.

Further according to the invention, there is provided a method for generating at least one pulse and/or pulse sequence(s) of pulses having at least one specified (predetermined or predeterminable) property such as pulse energy, duration, peak intensity, pulse shape and/or timing in a laser system, said method comprising the steps:

monitoring an amplification process in an amplifying cavity and obtaining data about at least one property of the pulse(s) and/or of the pulse sequence;

comparing the pulse property with reference data and forming an output signal;

controlling at least one switching means inside the amplifying cavity depending on the output signal, comprising the step of inputting, outputting and/or retaining the pulse in the amplifying cavity such that at least one property of the pulse sequences and/or the pulses at an output of the laser system has substantially a specified (predetermined or predeterminable) value.

According to a preferred embodiment of the invention, the pulses at the output of the laser system are ultrashort pulses, in particular femto- or picosecond pulses.

Further preferably, the method for generating at least one pulse and/or a pulse sequence(s) is applied for or implemented in a regenerative laser amplifier.

Preferably, the step of controlling is such that at least one property of the pulse sequence and/or the pulse(s) has at an output of the laser system a substantially constant value or varies according to a predetermined or predeterminable law in particular independent of one or more other properties. Still further preferably, the energy of the pulses in a pulse sequence at the output of the laser system is greater than a first value and/or smaller than a second value.

The method for generating pulse sequences may preferably comprise the step of compensating the dispersion of the pulse per amplifying cavity pass such that the duration of the generated pulses is substantially constant.

Still further preferably, the method may further comprise the step of introducing an amount of pulse dispersion per amplifying cavity such that the pulse duration at an output of the laser system is variable, the peak intensity of the pulses in the amplifying cavity is less than a predetermined or predeterminable value; and/or spatially divided pulse spectral components are generated in the amplifying cavity such that at least one pulse spectral component is selectively amplified thereby increasing the amplification bandwidth of the laser system.

Preferably, the method comprises a step of changing the effective length of the amplifying cavity so that it substantially corresponds to the operating speed of the switching means and/or the control means.

Furthermore, the method for generating pulse sequences may comprise the step of influencing the properties of the pulse sequence inside the amplifying cavity independent or indirect dependent of the output signal.

In the method for generating pulse sequences the reference data may preferably comprise data received from an external trigger; a seed pulse source, which outputs a seed pulse to the laser amplifier; a monitoring means, which monitors the state of progress of an application process involving the emitted from the laser system pulse sequence; and/or a prior data obtained from the detecting means during an amplification process in the amplifying cavity, wherein the reference data can be in particular dynamically updated.

Furthermore, the method for generating pulse sequences may comprise a step of changing at least one characteristic of an amplification process in the amplifying cavity, in particular the pumping of an amplifying medium in the amplifying cavity.

According to the invention, there is further provided a computer program product which comprises instructions that when loaded on a computer perform the method for generating pulse sequences according to the invention or an embodiment thereof. The invention is further directed to a computer-readable storage medium and to a signal comprising such computer program product.

The computer program product may be preferably realized for example in or as a FPGA (Field Programmable Gate Array) and/or an ASIC (Application Specific Integrated Circuit).

According to the invention there is further provided a controller for controlling a laser system comprising an amplifying cavity to generate at least one pulse and/or a pulse sequence(s) having at least one specified property, such as pulse energy, duration, peak intensity, pulse form and/or timing, comprising:

at least one controlling means which can receive and compare data obtained from a detecting means, which monitors an amplification process in the amplifying cavity and obtains data about at least one property of the pulse(s), with reference data and control at least one switching means for inputting, outputting and/or retaining the pulse(s) in the amplifying cavity such that at least one property of the pulse(s) at an output of the laser system has substantially a specified value.

Preferably, there is provided a controller for controlling a laser system, such that the pulses at the output of the laser system are ultrashort pulses in particular femto- or picosecond pulses.

Still further preferably the controller compares the data obtained from the detecting means with reference data comprises data received from an external trigger; user settings input device; a seed pulse source, which outputs a seed pulse to the laser amplifier; a monitoring means, which monitors the state of progress of an application process involving the emitted from the laser system pulse sequence; and/or a prior data obtained from the detecting means during an amplification process in the amplification cavity and wherein the reference data can be in particular dynamically updated.

The invention described above allows to considerably simplify the existing methods and applications or even the realization of numerous important applications in the wide field surrounding laser processing of materials and laser technology for the first time. In particular a dynamic regulation of the single pulse properties, in particular independently from each other and/or synchronization with external process or processes can be realized on a pulse-by-pulse basis. Thus, numerous important laser applications can be substantially improved or made realizable. For example the following applications are possible:

Generation of ultrashort (femto- and picosecond) laser pulses with specified (predetermined or predeterminable) properties independently of the pulse duration, in particular the pulse energy;

Adjusting (synchronizing) the pulse timing and/or the pulse energy to extremely asynchronous processes (e.g. to mechanical actuators, eye tracking system in the refractive corneal surgery, etc.). This allows greater processing speed while retaining high precision;

Increasing the security of the laser surgery, since the energy level can be predetermined and controlled preferably already at the time of generation of the individual pulse;

Synchronization with physical processes which are to be examined; In particular examining processes involving ultrashort (preferably femtosecond) laser pulses;

Pulse timing and/or pulse energy can be used as control signals in closed-loop with external control signal(s) (for example by precision trimming of resistance(s));

Efficient generation of the laser pulses with high peak power of for example 200 MW;

Adapting or adjusting the parameter(s) of the pulse sequence such, in particular the pulse timing and/or the pulse energy to the specific (predetermined or predeterminable) dynamics of the laser-material interaction process;

Complex microstructuring of materials with ultrashort, preferably femtosecond, pulse series;

Generating pulse series having a predetermined energy profile, in particular controlled energy of the single pulses in the pulse series;

Realization of a maximal system throughput, since the laser system is not bounded to a fixed/set repetition rate;

Increased flexibility and security of pulse generation through pulse-on-demand;

Controlling or compensating for a drifting of the laser stability, since the actual amplification process can be monitored, evaluated and controlled in a closed-loop-circuitry.

Some of the concepts for a laser platform for corneal surgery (for example asynchronous control of the actuators, eye tracking; secure level of energy of each pulse in a pulse) cannot be easily realized without the innovative changes of the laser system according to the invention.

These and other objects, features and advantages of the present invention will become more apparent upon reading of the following detailed description of preferred embodiments and accompanying drawings. It should be understood that even though embodiments are separately described, single features thereof may be combined to additional embodiments.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
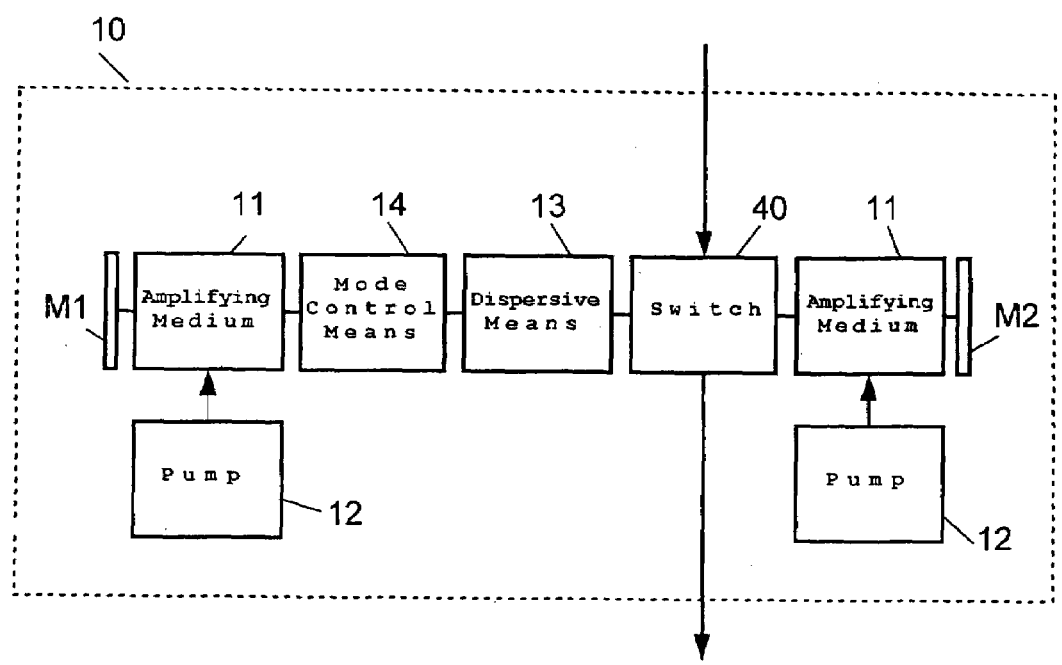
FIG. 1 is a schematic representation of an amplifying cavity according a preferred embodiment of the present invention.

FIG. 1 schematically represents an amplifying cavity 10 according to a preferred embodiment of the present invention.

The end surfaces M1 and M2 define an amplifying cavity (also called laser cavity) 10. The end surfaces M1 and M2 are preferably mirrors, which can be plane, concave, or of other appropriate shape. It is further desirable that the losses on the end-surfaces and throughout the laser cavity are kept to minimum—i.e. that low loss optic is employed.

The amplifying cavity 10 comprises at least one amplifying medium 11 (also denoted as gain medium or laser rod). The amplifying medium 11 is pumped by the pump 12, which may be a flash lamp, laser diode or other suitable pumping means, preferably through pumping optics.

Further within the amplifying cavity 10 there is positioned a switching means (or in short a switch) 40.

Preferably, the laser cavity 10 may comprise also at least one dispersive means 13 for manipulating the dispersion characteristics of the light (i.e. of the pulses) within the amplifying cavity 10, which will be explained in detail further on, and a mode control means 14. The mode control means may comprise any optical elements that place boundary conditions on the electromagnetic field (the laser beam) and thus control the transverse (for example beam waist) and longitudinal modes inside the amplifying cavity 10. Such optical elements can be lenses, plane or curved mirrors, prisms, wedges, hard or soft apertures, such as pinhole apertures or intensity dependent mode variations, diffractive elements such as holographic elements, gratings, adaptive optical elements such as micro-mirrors arrays, flexible membrane mirrors, etc. With a suitable mode control means 14, the transverse mode can be shaped so as to optimize the overlap of the pump beam and the amplified beam. Furthermore, the stability, the profile and the distribution of the electric field within the laser cavity can be determined and controlled.

The switching means (switch) 40 influences controllably the physical characteristics or properties of light, such as direction of propagation, wavelength, polarization, etc., to controllably generate 3 states, which correspond to the 3 states of the pulse:

State P1: seed. This state is characterized by high losses in the amplifying cavity 10 with the possibility to couple in an extraneous light pulse from an external pulse source 50.

State P2: circulate. This state is characterized by low losses of the amplifying cavity 10; light pulse circulates in the amplifying cavity 10.

State P3: dump. This state is characterized by high losses in the amplifying cavity 10 with the possibility to couple out or output (for example by changing the direction of propagation) one or more light pulses and make it/them available for an application (or an application module) 60.

The principle of the pulse amplification in the amplifying cavity 10 will be here shortly explained. When the switching means 40 is in the state corresponding to P1, a seed pulse from an optical pulse source enters the amplifying cavity 10 (:seed). The pulse starts to circulate within the amplifying cavity 10 when the switching means 40 is in the state corresponding to P2, making a variable or controllable, specified (predetermined or predeterminable) number of passes through the (pumped) gain medium 11 and being amplified therein, increasing its energy (:circulate). When the switching means 40 changes its state to the state corresponding to P3, the pulse is directed so as to exit the cavity (:dump). The switching means 40 may operate for example on the principle of polarization variations, or any other optical pulse property.

Figure 2:
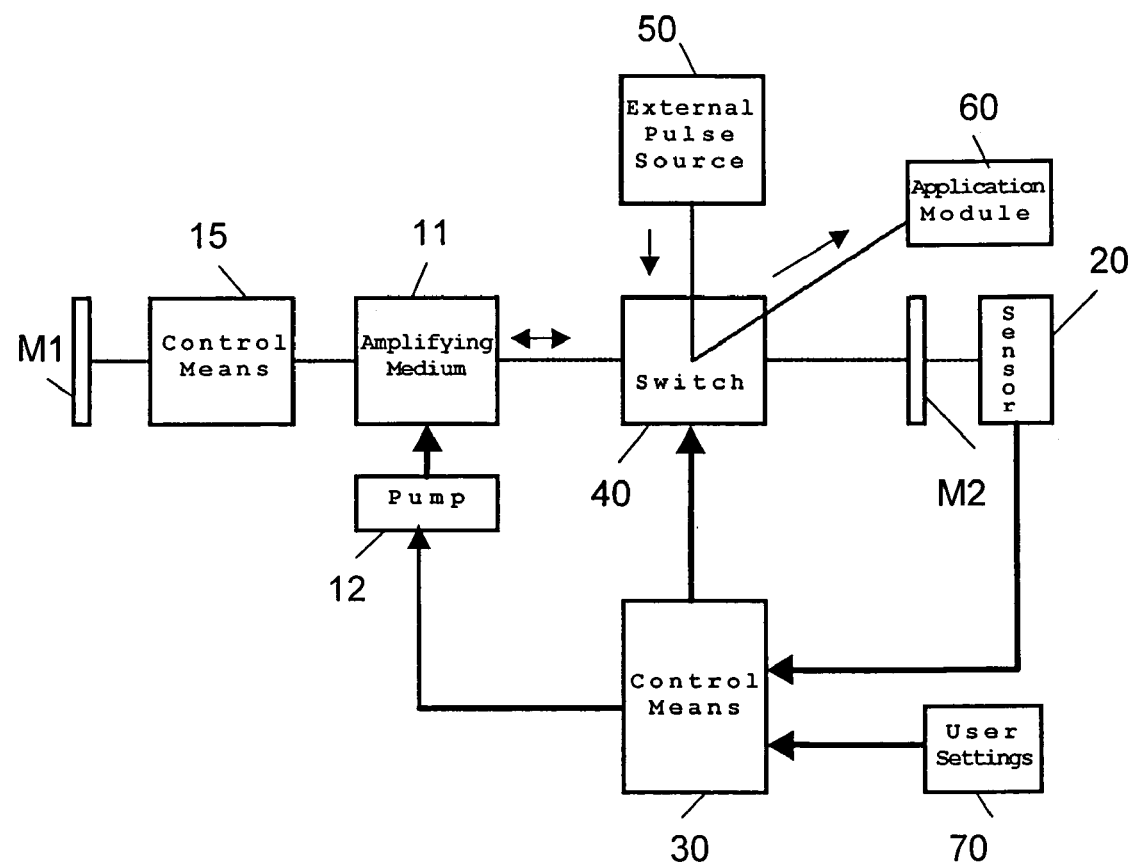
FIG. 2 is a schematic representation of a laser system according to a preferred embodiment of the present invention.
Figure 3:
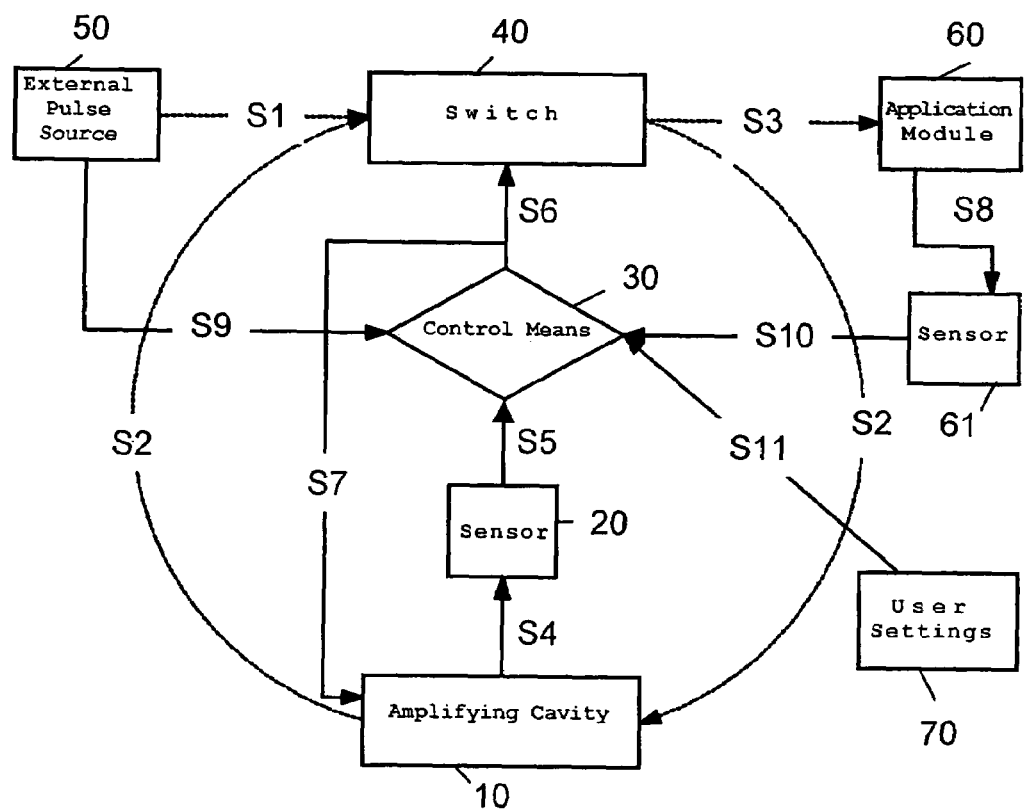
FIG. 3 is a flowchart illustrating the control process in the laser system.

FIG. 2 shows a schematic representation of a laser system according to a preferred embodiment of the invention. FIG. 3 respectively shows the flowchart illustrating the control process in the laser system.

Referring to FIGS. 2 and 3, the laser system comprises further a detecting means (sensor) 20 for example a photodiode, which monitors the dynamics or detects one or more properties of the pulses in state 2 (P2), wherein the pulse circulates in the laser cavity 10 and obtains or generates data about or on at least one specified (predetermined or predeterminable) property of the pulse within the amplifying cavity 10. The mirror M2 is such that a portion of the pulse being amplified reaches the sensor 20 at each turn in the amplifying cavity 10. Preferably the bandwidth of the detecting means 20 is approximately or more than 200 MHz. The optical pulse source 50 sends, preferably through input optics, not shown in the Figures a seed pulse, which depending on the state of the switching means 40 enters the amplifying cavity 10. The switching means 40 is controlled by the control means 30 to change its states particularly depending on the signal from an external trigger or user settings 70. The pulse is dumped from the amplifying cavity 10 when the switch 40 receives the corresponding signal from the control means 30 and is available to an application (application module) 60. The amplifying cavity 10 may comprise as well a pulse width control means 15 for controlling the pulse width (by for example compensating the group velocity dispersion per turn in the amplifying cavity 10).

Referring to FIG. 3, which illustrates the decision and control process, the following steps are performed:

S1: a seed pulse from the optical pulse source generator 50 (or a seed source) such as laser diode is coupled within (or directed to and trapped within) the laser cavity 10 via switch 40, controlled by the control means 30. The switch 40 is in the state corresponding to P1.

Based on the signal from the control means 30, step S2 or step S3 is initiated, i.e. the pulse circulates in or is dumped from the laser cavity 10.

S2: the pulse circulates (makes a number of passes) within the laser cavity 10. The switch 40, controlled by the control means 30 is in the state corresponding to P2.

S3: the (amplified) pulse exits (is dumped from) the laser cavity 10, the switch controlled by the control means 30 is in the state corresponding to P3.

While the pulse circulates in the amplifying cavity 10 the following steps are performed:

S4: the detecting means 20 monitors the state of amplification progress in the laser cavity, i.e. obtains data about at least one property of the pulse and/or pulse sequence such as pulse energy, duration, peak intensity, pulse form and/or timing.

S5: the control means 30 receives a signal of the detecting means 20 based on the detected data.

S6: the control means 30 compares the signal received from the detecting means to an external (predetermined or predeterminable) data and controls the states of the switching means, in particular the switching means 40 to initiate the step S2 or S3. In addition, it may preferably send a signal to the pump modulating means to modulate the pump or gain characteristics and/or to other means, capable to change the properties of the amplification process (step S7).

The external data may comprise for example user settings or external trigger data (step S11). Further preferably the external data may comprise data indicating the processing progress in the target application 60 detected by the detecting means (sensor) 61 (step S10), so that the control of the pulse sequence is synchronized or made dependent on the progress (the achieved effect) of the target application (closed-loop). Still further preferably, the external data may comprise a signal from the pulse source 50 (step S9), so as to synchronize the switching means to the pulse source.

The external data may also comprise a prior data obtained from the detecting means 20 during an amplification process in the amplifying cavity 10, so that the switching time of the switching means 40 can be extrapolated from the amplification process (up to this time point). More preferably, the control means 30 controls the switching means 40 such that the properties (characteristics) of the amplification process so far (i.e. the data obtained by the detecting means 20 during the amplification process in the amplifying cavity 10) are taken into account. In particular, the external data, which may be suitably stored in a memory or database (not shown), may be dynamically or periodically updated preferably based on the obtained so far data or in other words extrapolated based on the prior data. The control means 30 operates on the difference between the external data and the detected data exhibiting preferably proportional, differential and/or integral behavior and extrapolates the correct time of switching (of the switching means 40) from the characteristic amplification process so that pulses with desired properties are outputted from the laser system.

Further preferably, the control means 30 may decide on the modulation of the optical pump 12, respectively send a signal to a pump or gain modulation means to modulate the optical pump (S7).

The switching means 40 may comprise as well at least one passive switching element, whose states do not depend on or only indirectly depend on the (signal from) the control means 30. This control sequence can be preferably realized as a computer program product suitably recorded on a computer program product or as a signal in a signal carrier. The computer program product may be realized for example in or as a FPGA (Field Programmable Gate Array) and/or an ASIC (Application Specific Integrated Circuit).

Figure 4A:
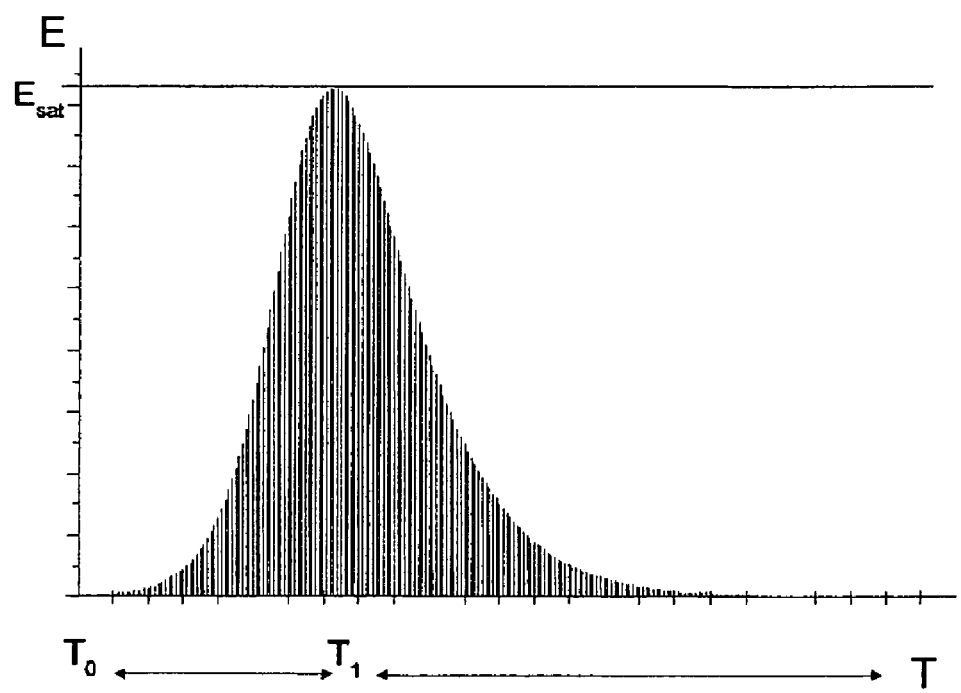
FIG. 4A illustrates the characteristic amplification process.

FIG. 4A is a graph illustrating the characteristic amplification process in the state P2, i.e. when the pulse circulates in the laser cavity 10. The abscissa of this graph represents the time T the pulse circulates in the laser cavity 10 (i.e. the number of passes), the ordinate shows the pulse energy E.

The characteristic amplification process in the state P2, can be split in 2 phases:

In the interval T0 . . . T1 amplification phase, characterized by exponential increase for small signal amplification, then energy increase up to saturation energy Es. In this phase, the amplification can be shaped advantageously by for example a suitable modulation of optical pumping (or gain modulation).

In the interval T1 . . . T∞: Loss phase, characterized by exponential loss of pulse energy resulting from losses in the laser cavity 10, such as reflection or scattering losses, etc.

Figure 4B:
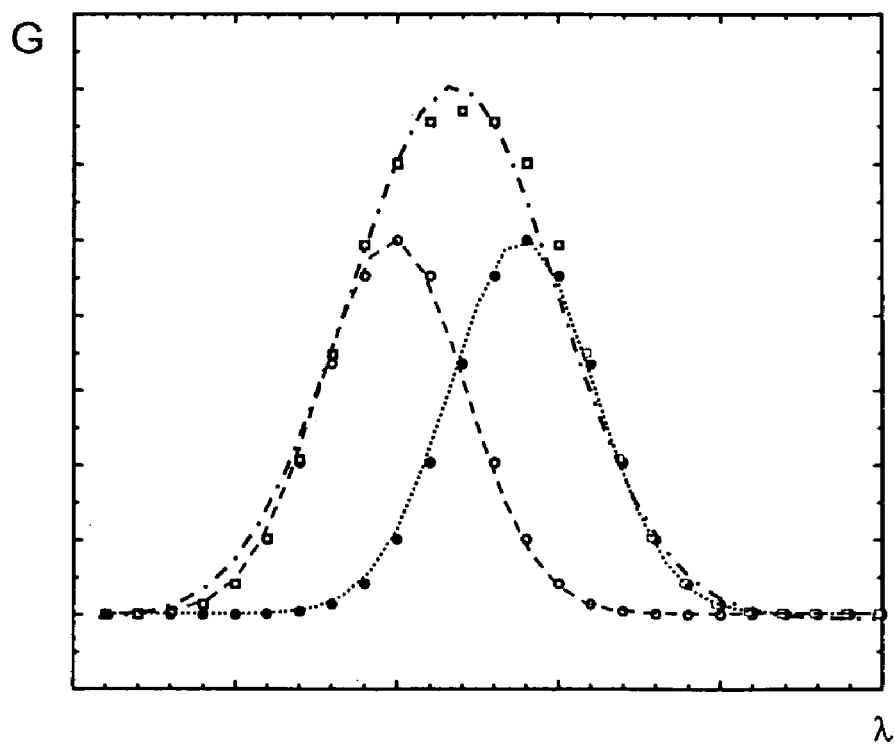
FIG. 4B illustrates the solution of the problem of gain-narrowing using two different amplification mediums.

One aspect of the characteristic amplification process is the iterative reduction of the pulse spectrum, caused by the finite bandwidth of the amplification medium 11. Because of the reduction of the pulse spectrum, after the amplification the original pulse (or seed pulse) duration can not be completely recovered and as a result the amplified pulse becomes elongated in time. This problem may be alleviated by preferably combining two or more amplifying media, which at comparable bandwidth of the amplification profiles have amplification maximums shifted from each other at a suitable distance, so that the resulting amplification profile of the amplifying cavity 10 has increased bandwidth as shown on FIG. 4B, depicting change of the gain G (ordinate) vs. the wavelength $\lambda$ (in absolute units) the pulse circulates in the amplifying cavity 10 (abscissa). The chain-line on FIG. 4B depicts the gain profile of a first gain medium, the dotted-line depicts the gain profile of the second gain medium, and the chain-dotted-line depicts the resulting gain profile. Using such combination of amplifying mediums as shown on FIG. 4B, the resulting bandwidth of the gain medium profile may be increased and the pulses (seed pulses) can be amplified to higher peak powers.

The time of origin of the pulse in a pulse sequence and the pulse energy should be freely selectable. The sensor (or detection means 20) and the analogue electronic which is required to achieve this should be appropriately fast, preferably such as to allow for the pulse properties (for example the pulse energy) to be analyzed within one inverse pass of the amplifying cavity 10. The detection means 20 should preferably have a bandwidth of approximately and greater than 200 MHz.

The amplifying medium 11 may be for example a Ti:sapphire, Nd:YAG (neodymim-doped yttrium aluminum garnet), Nd: Glass; Nd: YLF (YAG (neodymim-doped yttrium lithium fluoride) Yt:glass, Cr:LiSaF or other appropriate amplifying (gain) media, in particular gain medium suitable for amplification of the ultrashort (femto- and pico) second pulses. The optical pulse source is preferably a laser source, for example Nd:glass oscillator, laser diode, Ti:sapphire laser, etc, preferably capable of generating ultrashort (femto- and picosecond) pulses, which is coupled to the amplifying cavity 10 preferably through an input optics. Naturally, the amplifying cavity 10 may also comprise other optical elements, such as for example mirrors, lenses prisms, diffraction gratings, spatial light modulators, etc., forming for example a mode control unit, a focusing assembly, etc.

The control means 30 may be realized as FPGA (Field Programmable Gate Array) or ASIC (Application Specific Integrated Circuit), which may be synchronized with the optical seed pulse source. Preferably, the bandwidth of the detecting means 20 and/or control means 30 is approximately or greater than 200 MHz. The switching means may comprise electrooptical light modulators (EOM); Acousto-optical light modulators (AOM); magneto-optical modulators; switching means based on change in the wavelength, for example periodically poled nonlinear materials such as lithium niobate, KTP for efficient frequency conversion in conjunction with dichroic mirror coating/beamsplitter and/or other high speed optical switches. The repetition rate of the optical switching means is preferably in the range 1 to 200 KHz, most preferably greater than 10 KHz.

The detection of the current pulse energy can be realized for example by integrating the signal/data from the photodiode (such as GaAs diode) about the one or more properties of the circulating pulse in the amplifying cavity and passing it through a sample-and-hold circuit. Since at present the latency time of the conventional optical switches lies above the time necessary for a pulse to make one turn in the amplifying cavity 10, preferably the time the pulse is outputted (dumped) from the amplifying cavity 10 is extrapolated by the control means 30 using laser theory models of the laser (amplifier) behavior (i.e. modeling the amplification process). This allows to start the optical switching by the switching means 40 at the specified time, so that a pulse with at least one specified (predetermined or predeterminable) property is outputted from the amplifying cavity 10 and is made available at the output of the laser system for further use e.g. to the application module 60.

Another aspect of the amplification process is the variable time delay (different propagation time) of the different spectral components within the amplifying cavity 10, which preferably requires a compensation of the group velocity dispersion, to prevent a dephasing especially of short pulses. The dispersion of all the elements within the laser cavity 10 can be compensated with the help of a dispersion compensating means 15 (pulse width control means) comprising respective elements, for example diffraction gratings, prisms or a combination of these, so that the effective dispersion is preferably substantially zero. Thus, it can be assured that the original pulse form and in particular the pulse duration is preserved at every subsequent point in time.

The dispersion of all elements within the laser cavity 10 can be compensated by a dispersion compensating means 15, comprising for example a diffraction grating or a prism or an arrangement of multiple elements (e.g., for example an arrangement of multiple prisms), so that in total no dispersion occurs. This ensures that at any point in time in the future, the original pulse form, in particular the pulse duration can be kept substantially constant.

Alternatively, the amount of dispersion per amplifying cavity pass (or turn) may be used advantageously to generate pulses with different duration or to successively stretch the pulses in time so that the peak pulse energy during the amplification process can be kept always below a critical value $E_{crit}$, for example smaller than the damage threshold of the amplifying medium 11. Preferably, the amplifying cavity 10 comprises also a dispersive means 13 within the amplifying cavity 10, such that a specified amount of the dispersion per amplifying cavity pass (or turn) is introduced, so that desired variation of the pulse duration and/or the constraint of the peak energy is achieved. The accumulated dispersion (e.g. group velocity dispersion) may be compensated in an external compressor means, comprising for example at least one grating or suited dispersive bulk material.

Figure 6:
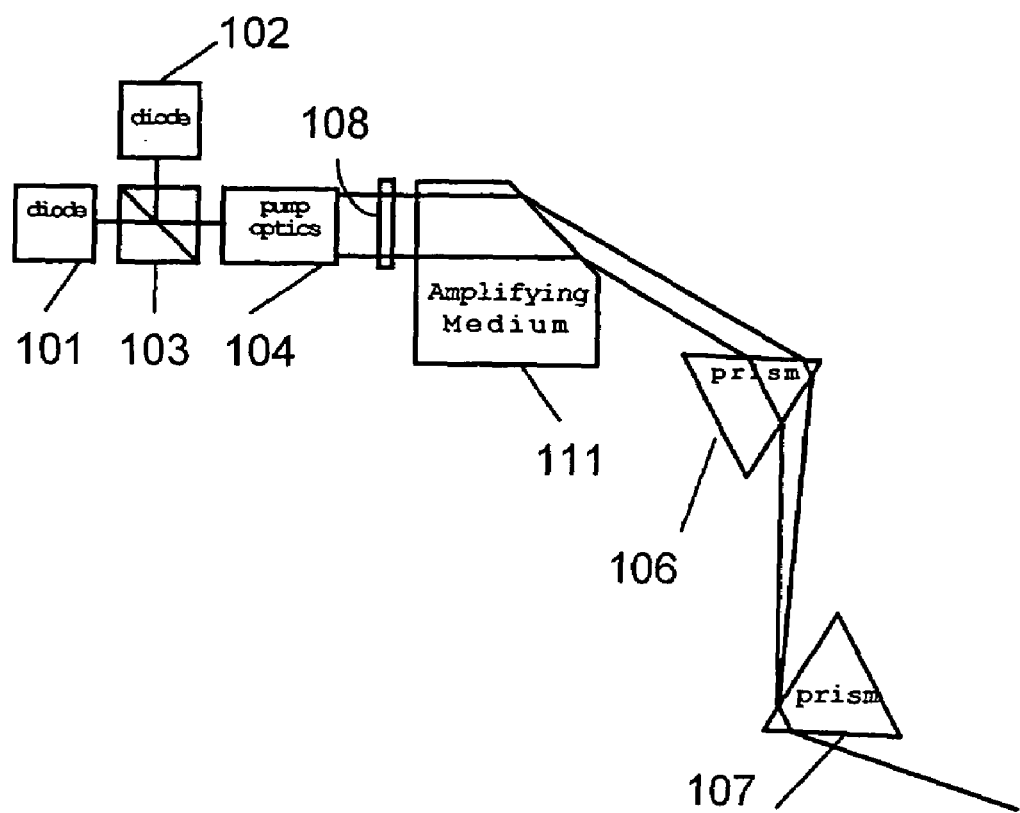
FIG. 6 is a schematic representation of a selective pumping of the spectral regions.

Furthermore, preferably the dispersive means 13 (for example a prism arrangement as shown on FIG. 6) may preferably be used to amplify selectively specific spectral areas or ranges to prevent the gain narrowing described above. As shown on FIG. 6, the dispersive means 13, in this case a combination of two prisms 107a and 107b generates a spatial separation of the pulse's spectral components in the amplifying medium 111, which are then amplified selectively. As shown on FIG. 6, the selective amplification may be realized for example by the use of a pump-optic comprising at least one Spatial Light Modulator (SLM) 108 to direct the pump light to a specified amplification region in order to selectively amplify single wavelength regimes (for example the blue or the red regions) within the amplification profile of the amplifying medium 111. Thus the effect of gain-narrowing described above may be alleviated.

With increasing the distance $d = \overline{M_1 M_2}$ between the end-surfaces (end-mirrors) of the laser cavity c, the distance in time $T = 2d/c$ between two pulse cavity passes (or turn) can be adjusted in such a way as to result in a technically realizable switching time of switching means 40. The length of the amplifying cavity 10 should be selected as long as possible, so as to allow for a technically realizable reaction (response) time of the switching elements 40 and the control means 30.

Figure 5A:
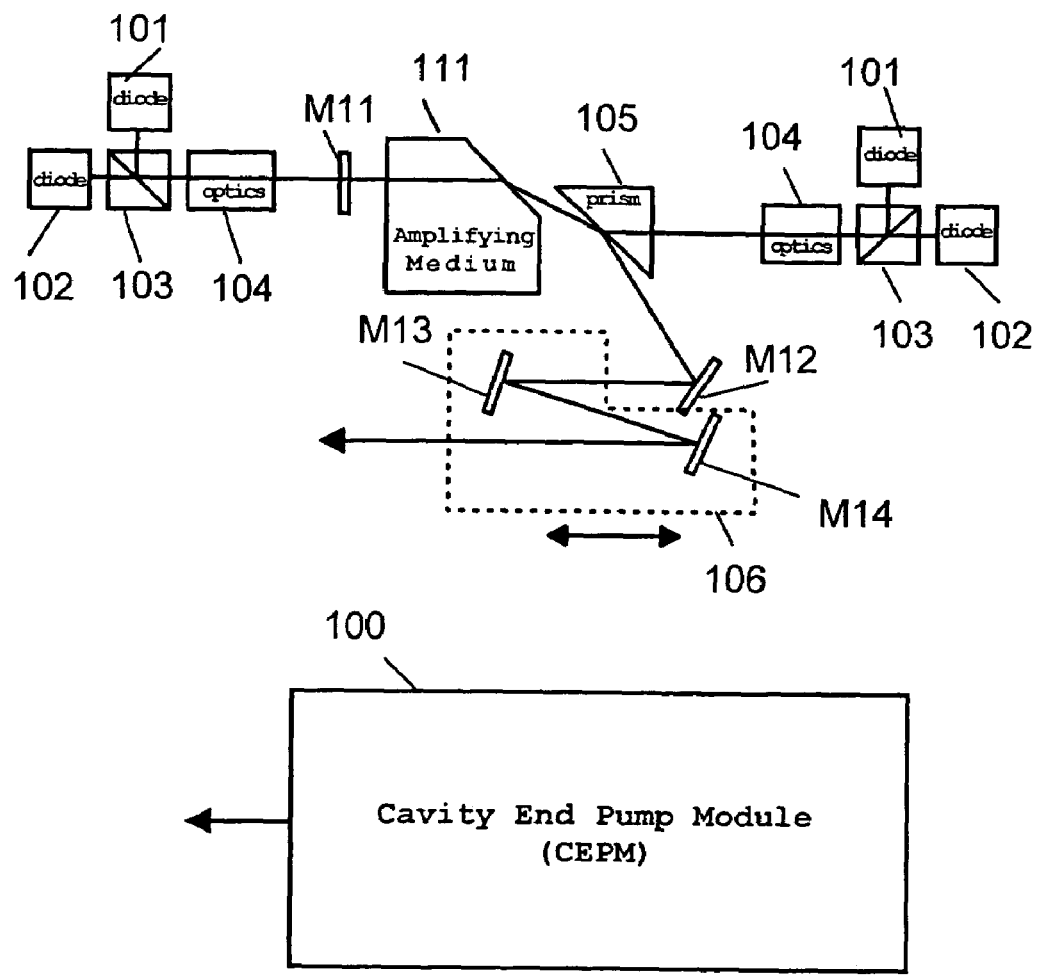
FIG. 5A is a schematic representation of one cavity-end-pump-module (CEPM)
Figure 5B:
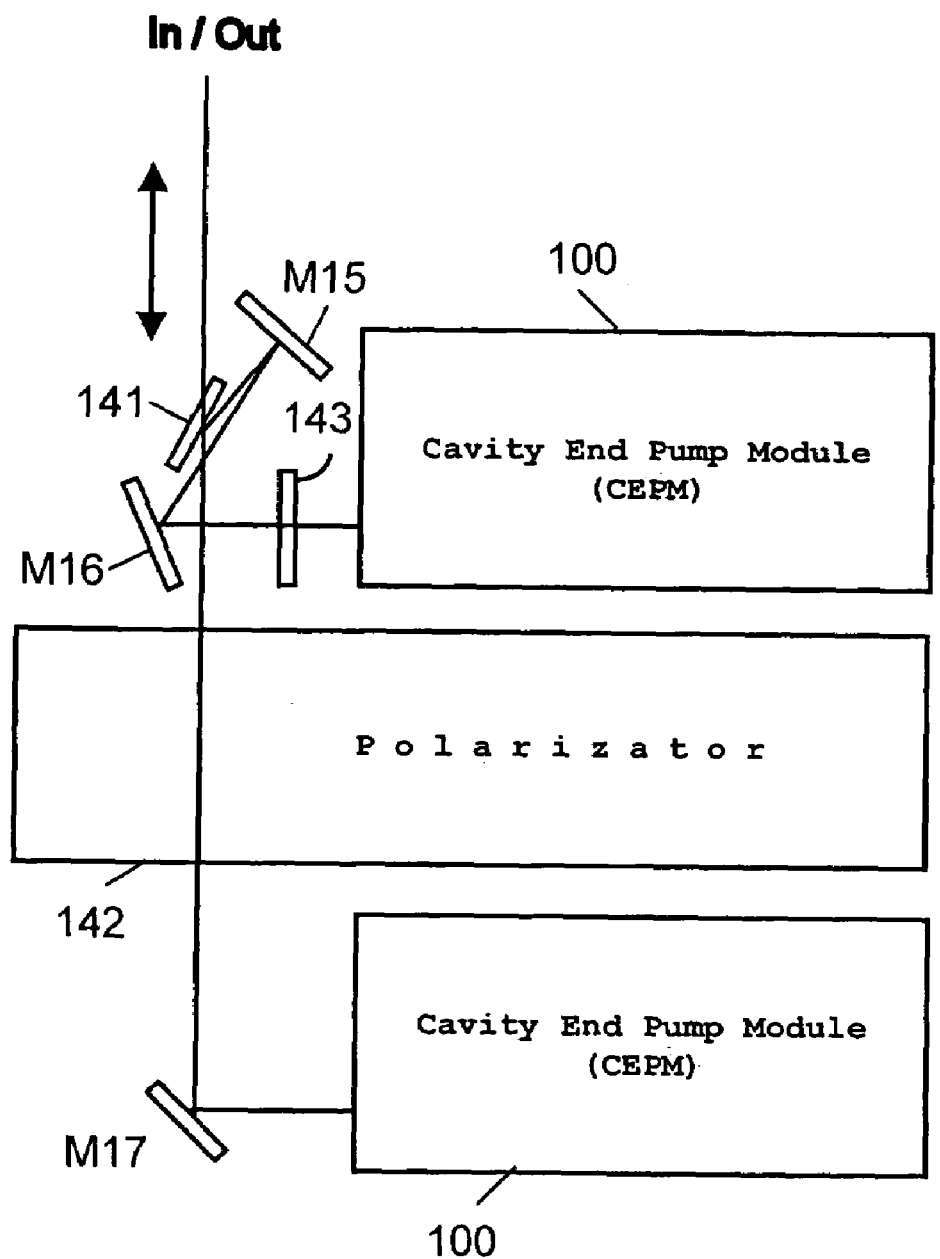
FIG. 5B illustrates the combination of two cavity-end-pump-modules (CEPM) in a single laser system.

FIGS. 5A and 5B show one advantageous realization of a pump arrangement for a laser system capable of generation of pulse sequences with high pulse repetition rate/timing. The realization of the pump arrangement also called cavity-end-pump-module (CEPM in short) 100 is shown on the upper part of FIG. 5A and its schematic representation in the lower left part FIG. 5A. Two CEPM 100 can be combined with an electrooptical switch (for example Pockels cell) 141 and a polarizator 142 (e.g. a thin film polarizator) to an amplification laser as shown on FIG. 5B. Referring to FIGS. 5A and 5B, this system is characterized by multiplexing of the pump arrangement—i.e. as shown on the Figures the light of two pairs of laser diodes 101, 102 which are arranged generally on the left and right side of the amplifying medium 111 is combined by the beam splitter 103 and directed via pump optics 104 to the amplifying medium 111. The amplifying medium 111 may be substantially symmetric form, or be asymmetric as shown on FIG. 5A with one plane surface (which can be also a mirror surface) and at least a part of the second surface cut preferably at Brewster angle. Furthermore, the CEPM comprises a prism 105, which compensated for the asymmetry, so that substantially the same arrangement of the laser diodes 101, 102, respectively pump optics may be used on the left and the right side of the amplifying medium 111, thus reducing for example the system complexity. Furthermore, the CEPM 100 comprises a set of mirrors M11, M12, M13, M14. The pumping light from the first pair of laser diodes 101, 102 enters the amplifying medium 111 through the mirror M11. Mirrors M13 and M14 form together a focus adjusting assembly 106. FIG. 5B shows a combination of two CEPM to a single laser amplifier system (i.e. so combined as to form a single amplifying cavity 10) with the help of a thin film polarizer 141 and a Pockels cell 142, which together form a switching means 40 for input/output of the pulse from the amplifying cavity 10. The system further comprises a λ/2 wave plate 143, wherein λ is the pulse wavelength, and mirrors M15, M16 and M17.

A laser source with the arbitrary-pulse sequence and pulse-on-demand can be constructed as a separate module or may be integrated within a greater system targeted for a specific application, thus utilizing effectively the light energy constrained in time and space (light pulse). To design a whole system for a particular application, the laser source can be integrated with for example application module/unit, control-software, control electronic/hardware, mechanical part and casing.

While the particular Laser System and Method for Generation of a Pulse Sequence with Controllable Parameters and Computer Program Product as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A laser system for generating an amplified laser pulse having at least one specified pulse property, said system comprising:
   an optical pulse source for generating a seed pulse;
   an amplifying cavity;
   a switching means for introducing the seed pulse into said amplifying cavity at a predetermined entry time; and
   a detecting means for monitoring amplification of the seed pulse in the amplifying cavity, and for sending data to a control means, wherein said control means determines when the seed pulse has been amplified to have a prescribed value of the specified pulse property, and wherein said switching means is responsive to said control means, for outputting the amplified pulse having the specified pulse property from the amplifying cavity at a predetermined emission time.

2. A system as recited in claim 1 wherein the entry time ($T_{K-1}$) of the seed pulse, and the emission time of the amplified pulse ($T_K$) have a relationship of $T_K=\Delta T_K+T_{K-1}$, wherein $\Delta T_K$ is determined by said control means.

3. A system as recited in claim 1 wherein the energy of the seed pulse at entry time ($E_{K-1}$), and the energy of the amplified pulse at emission time ($E_K$) have a relationship of $E_K=\Delta E_K+E_{K-1}$, wherein $\Delta E_K$ is determined by said control means.

4. A system as recited in claim 1 wherein the duration of the seed pulse at entry time ($\tau_{K-1}$), and the duration of the amplified puke at emission time ($\tau_K$) have a relationship of $\tau_K=\Delta\tau_K+\tau_{K-1}$, wherein $\Delta\tau_K$ is determined by said control means.

5. A system as recited in claim 4 wherein pulse duration is substantially constant ($\Delta\tau_K=0$).

6. A system recited in claim 1 wherein said control means compares data from said detecting means with reference data to determine when a prescribed value of the specified pulse property determined from an external application is obtained.

7. A system as recited in claim 6 wherein the reference data includes pulse property information selected from the group of pulse properties consisting of pulse energy, pulse duration, peak intensity, pulse form, time and combinations thereof.

8. A laser system as recited in claim 1 wherein the seed pulse is part of a pulse sequence and the system further comprises at least one pulse dispersion compensating means for compensating the dispersion of the seed pulse per amplifying cavity pass such that the duration of the pulses in the pulse sequence at an output of the laser system is substantially constant.

9. A laser system as recited in claim 1 further comprising at least one pulse dispersive means for introducing a specified amount of pulse dispersion per amplifying cavity pass so that the pulse duration at an output of the laser system is variable.

10. A laser system as recited in claim 1 further comprising at least one pulse dispersive means for introducing an amount of pulse dispersion per amplifying cavity pass such that the peak intensity of the pulses in the amplifying cavity is less than a predetermined value.

11. A laser system as recited in claim 1 further comprising at least one pulse dispersive means for generating spatially divided pulse spectral components in the amplifying cavity such that at least one pulse spectral component is selectively amplified to increase the effective amplification bandwidth of the laser system.

12. A method for generating an amplified laser pulse having at least one specified pulse property, said method comprising the steps of:
   generating a seed pulse;
   introducing the seed pulse into an amplifying cavity using a switching means at a predetermined entry time;
   monitoring amplification of the seed pulse in the amplifying cavity to determine when the seed pulse has been amplified to have a prescribed value of the specified pulse property; and
   outputting the amplified pulse having the specified pulse property from the amplifying cavity at a predetermined emission time.

13. A method as recited in claim 12 wherein the entry time ($T_{K-1}$) of the seed pulse, and the emission time of the amplified pulse ($T_K$) have a relationship of $T_K=\Delta T_K+T_{K-1}$, and wherein $\Delta T_K$ is predetermined.

14. A method as recited in claim 12 wherein the energy of the seed pulse at entry time ($E_{K-1}$), and the energy of the amplified pulse at emission time ($E_K$) have a relationship of $E_K=\Delta E_K+E_{K-1}$, and wherein $\Delta E_K$ is predetermined.

15. A method as recited in claim 12 wherein the duration of the seed pulse at entry time ($\tau_{K-1}$), and the duration of the amplified pulse at emission time ($\tau_K$) have a relationship of $\tau_K=\Delta\tau_K+\tau_{K-1}$, and wherein $\Delta\tau_K$ is predetermined.

16. A method as recited in claim 15 wherein pulse duration is substantially constant ($\Delta\tau_K=0$).

17. A method as recited in claim 12 further comprising the step of comparing data during amplification of the seed pulse with selected reference data to determine when the prescribed value of the specified pulse property is obtained.

18. A method as recited in claim 17 wherein the reference data includes pulse property information selected from the group of pulse properties consisting of pulse energy, pulse duration, peak intensity, pulse form, time and combinations thereof.

19. A laser system for generating an amplified laser pulse having at least one specified pulse property, said system comprising:
   an optical pulse source for generating a seed pulse;
   an amplifying cavity;
   a first switching means for introducing the seed pulse into said amplifying cavity at a predetermined entry time;
   a detecting means for monitoring amplification of the seed pulse in the amplifying cavity, and for sending data to a control means, wherein said control means determines when the seed pulse has been amplified to have a prescribed value of the specified pulse property; and
   a second switching means, responsive to said control means, for outputting the amplified pulse having the specified pulse property from the amplifying cavity at a predetermined emission time.

20. A laser system as recited in claim 19 further comprising at least one passive switching means, whose state does not depend on the control means.

* * * * *